(12) United States Patent
van den Hof

(10) Patent No.: US 11,162,968 B2
(45) Date of Patent: Nov. 2, 2021

(54) BICYCLE SPEED SENSOR

(71) Applicant: GIANT ELECTRIC VEHICLE KUNSHAN CO., LTD., Jiangsu (CN)

(72) Inventor: Arjen Niels van den Hof, Kunshan (CN)

(73) Assignee: Giant Electric Vehicle Kunshan Co., Ltd., Jiangsu Province (CN)

( * ) Notice: Subject to any disclaimer, the term of this patent is extended or adjusted under 35 U.S.C. 154(b) by 38 days.

(21) Appl. No.: 16/047,368

(22) Filed: Jul. 27, 2018

(65) Prior Publication Data
US 2019/0033337 A1 Jan. 31, 2019

(30) Foreign Application Priority Data
Jul. 31, 2017 (TW) ................................ 106211240

(51) Int. Cl.
| | | |
|---|---|---|
| *G01P 3/50* | (2006.01) | |
| *B62J 99/00* | (2020.01) | |
| *B62L 3/02* | (2006.01) | |
| *G01P 3/44* | (2006.01) | |
| *B62L 1/00* | (2006.01) | |
| *B62J 45/40* | (2020.01) | |

(52) U.S. Cl.
CPC ................ *G01P 3/50* (2013.01); *B62J 99/00* (2013.01); *B62L 1/005* (2013.01); *B62L 3/023* (2013.01); *G01P 3/44* (2013.01); *B62J 45/40* (2020.02)

(58) Field of Classification Search
CPC ..... G01P 3/50; G01P 3/44; B62J 99/00; B62J 2099/002; B62L 1/005; B62L 3/023; G01N 3/02; B62K 3/00; B62M 6/50; B62M 6/90

USPC ............................... 324/200, 207.24; 73/794
See application file for complete search history.

(56) References Cited

U.S. PATENT DOCUMENTS

| | | | |
|---|---|---|---|
| 2014/0074348 A1* | 3/2014 | Kitamura | ............. G01L 25/006 |
| | | | 701/33.1 |
| 2018/0072096 A1* | 3/2018 | Shahana | ............. B60B 27/0068 |
| 2018/0290709 A1* | 10/2018 | Tsuchizawa | ............. B62J 99/00 |

FOREIGN PATENT DOCUMENTS

TW M472193 U 2/2014

* cited by examiner

*Primary Examiner* — Melissa J Koval
*Assistant Examiner* — Trung Q Nguyen
(74) *Attorney, Agent, or Firm* — Muncy, Geissler, Olds & Lowe, P.C.

(57) ABSTRACT

A bicycle speed sensor is provided on a bicycle. The bicycle includes a chain stay, a rear wheel, a brake disk and a positioning member. The rear wheel includes a hub and the brake disk includes a center hole disposed for the hub to pass through. The positioning member passes through the chain stay, the center hole and the hub so that the rear wheel and the brake disk are positioned on the chain stay. The bicycle speed sensor includes a signal transmitter and a signal sensor. The signal transmitter is configured to transmit a signal and disposed on the brake disk. The signal sensor receives the signal from the signal transmitter and is disposed on the chain stay. By fixedly positioning the signal transmitter and the signal sensor at the brake disk and a default position of and the chain stay respectively, displacements of sensor components is prevented to provide reliable sensing data.

8 Claims, 9 Drawing Sheets

BICYCLE SPEED SENSOR

FIELD OF THE INVENTION

The present invention relates to a sensor, and more particularly to a bicycle speed sensor.

BACKGROUND OF THE INVENTION

A bicycle, also called a bike, a cycle, an iron horse etc., is the common tools of transportation. However, with the changes of the times, bicycles have become a recreational tool in modern life. When riding a bicycle, people may enjoy the scenery along the road and enjoy sports and fitness at the same time, which is widely loved by the public. In order to allow users to obtain their own riding data such as speed, cadence, etc., sensors will be installed on the bicycles for related measurement.

For example, Taiwan Patent No. M472193 "Bicycle Sensor" discloses a bicycle sensor comprising a sensing unit and two magnets respectively fixed on a rear wheel and a crank. The sensing unit is fixed on the chain stay.

However, all the bicycle sensors in the prior art are provided uncased. That is, the problem of vibration will occur when riding, which in turn causes displacements of the external sensing unit and the two magnets to affect the sensing of distance, resulting in inaccurate sensing. Therefore, how to prevent the displacements of the sensing components to reduce the sensing inaccuracy is indeed a goal that the related industries work together.

SUMMARY OF THE INVENTION

A main objective of the present invention is to solve the problem of sensing inaccuracy caused by the displacements of the sensing components.

To achieve the above objective, the present invention provides a bicycle speed sensor provided on a bicycle. The bicycle includes a chain stay, a rear wheel, a brake disk and a positioning member. The rear wheel includes a hub and the brake disk includes a center hole deposed for the hub to pass through. The positioning member passes through the chain stay, the center hole and the hub so that the rear wheel and the brake disk are positioned on the chain stay. The bicycle speed sensor includes a signal transmitter and a signal sensor. The signal transmitter adjacent to the hub is configured to transmit a signal. And, the signal transmitter is disposed on a side of the brake disk adjacent to the chain stay. The signal sensor is configured to receive the signal and disposed at a default position of the chain stay, and the default position is flanked with the signal transmitter.

In summary, the present invention has the following characteristics:
1. By fixedly positioning the signal transmitter and the signal sensor at a default position of the brake disk and the chain stay, not in the manner of additional arrangement, displacements of the signal transmitter and the signal sensor due to vibration thus may be prevented to provide reliable speed sensing data.
2. Since the signal transmitter and the signal sensor are fixedly positioned close to the bicycle body, the wind resistance may be reduced.

DETAILED DESCRIPTION OF THE PREFERRED EMBODIMENTS

Figure 1:
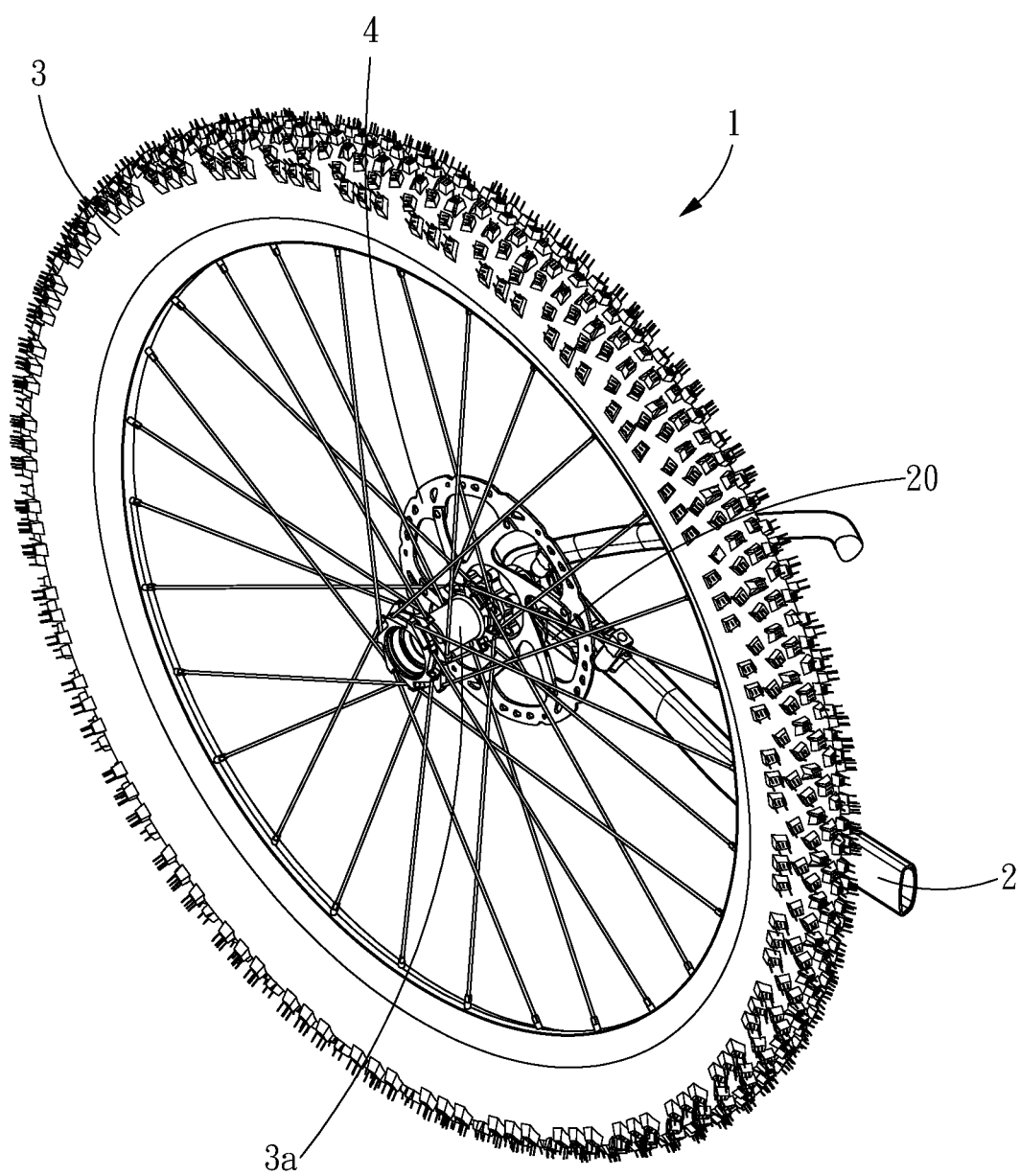
FIG. 1 is a perspective view of a first embodiment of the present invention.
Figure 2:
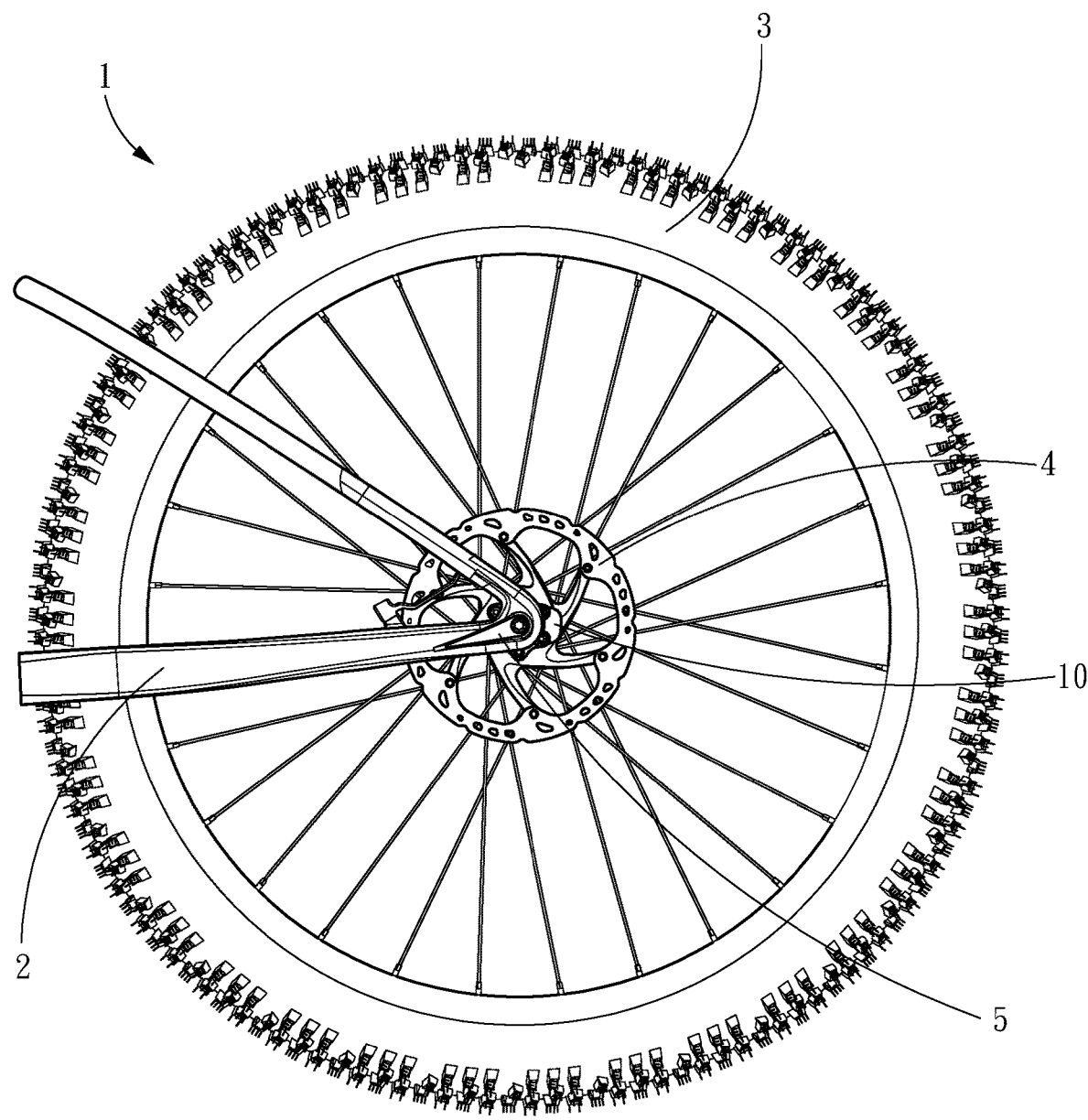
FIG. 2 is a plan view of the first embodiment of the present invention.
Figure 3:
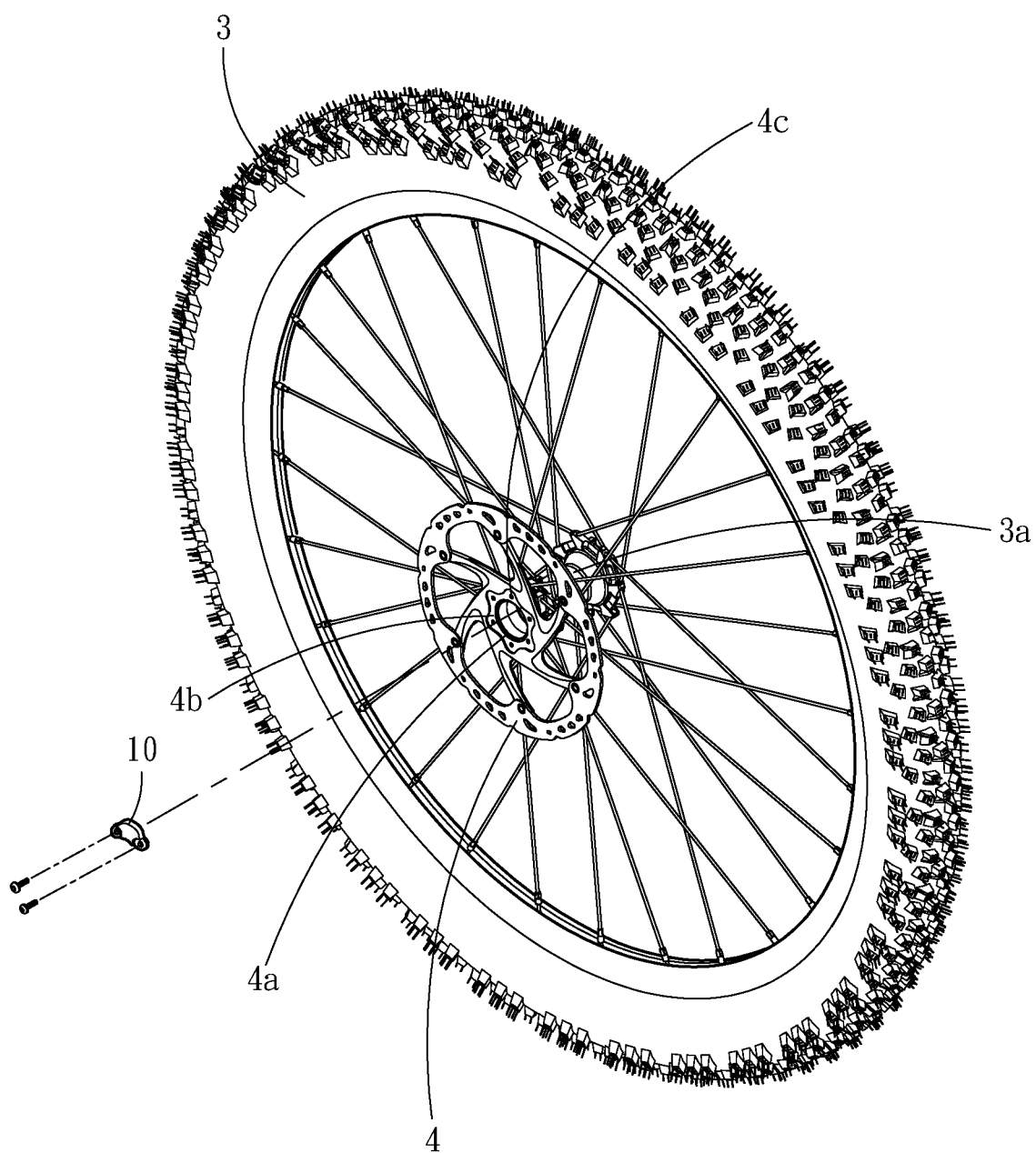
FIG. 3 is a partial exploded view of the first embodiment of the present invention.

The detailed description and technical content of the present invention are described below with reference to the accompanying drawings.

Referring to FIGS. 1, 2, 3 and 4, the present invention is a bicycle speed sensor provided on a bicycle 1. The bicycle 1 includes a chain stay 2, a rear wheel 3, a brake disk 4 and a positioning member 5. The rear wheel 3 includes a hub 3*a* and the brake disk 4 includes a center hole 4*a* disposed for the hub 3*a* to pass through. The positioning member 5 passes through the chain stay 2, the center hole 4*a* and the hub 3*a* so that the rear wheel 3 and the brake disk 4 are positioned on the chain stay 2. In the present invention, the positioning member 5 is a quick-release structure, and the center hole 4*a* is locked onto the hub 3*a*. Furthermore, the bicycle speed sensor includes a signal transmitter 10 and a signal sensor 20. The signal transmitter 10 is disposed on a side of the brake disk 4 adjacent to the chain stay 2, and the signal transmitter 10 adjacent to the hub 3*a*. The signal transmitter 10 is configured to transmit a signal. Further, in the present invention, the signal transmitter 10 may be a magnet. The signal sensor 20 is fixed to a default position of the chain stay 2 adjacent to the signal transmitter 10, and the signal sensor 20 is configured to receive the signal.

In a first embodiment of the present invention, the signal transmitter 10 is a magnet, and the brake disk 4 includes a plurality of fixing holes 4*c* adjacent to the center hole 4. The signal transmitter 10 is locked in any two adjacent fixing holes of the fixing holes 4*c*, so as to prevent the signal transmitter 10 from being displaced. In addition, the signal transmitter 10 may also be locked in any three of the adjacent fixing holes 4*c*, but not limited to any two adjacent fixing holes of the fixing holes 4*c*. The configuration may be altered as required, but not limited thereto. The signal transmitter 10 rotates with the rear wheel 3 when the user is riding the bicycle, so that the signal sensor 20 is able to sense and receive the signal from the signal transmitter 10. Further, the signal sensor 20 may transmit the signal to the external device to calculate the riding speed, or the signal sensor 20 may calculate the riding speed independently.

In the present invention, the position of the signal transmitter 10 and the signal sensor 20 are pre-designed before assembling, wherein the position of the signal sensor 20 is the default position of the chain stay 2. The signal transmitter 10 and the signal sensor 20 are directly positioned on the brake disk 4 and the default position of the chain stay 2, respectively. Therefore, comparing to the conventional assembling method which arranges the signal transmitter 10 and the signal sensor 20 with the aforesaid assembling method of the present invention is able to prevent the signal transmitter 10 and the signal sensor 20 from displacing due to vibration. Additionally, the brake disk 4 is an iron product so that the magnet may further attract the brake disk 4 through the magnetic force to prevent the brake disk 4 from disengaging. Further, the signal transmitter 10 may be locked in the fixing holes 4c to maintain the sensing distance and provide reliable speed sensing data. Since the signal transmitter 10 and the signal sensor 20 are fixedly positioned close to the bicycle body, thus the wind resistance may be reduced.

Figure 4:
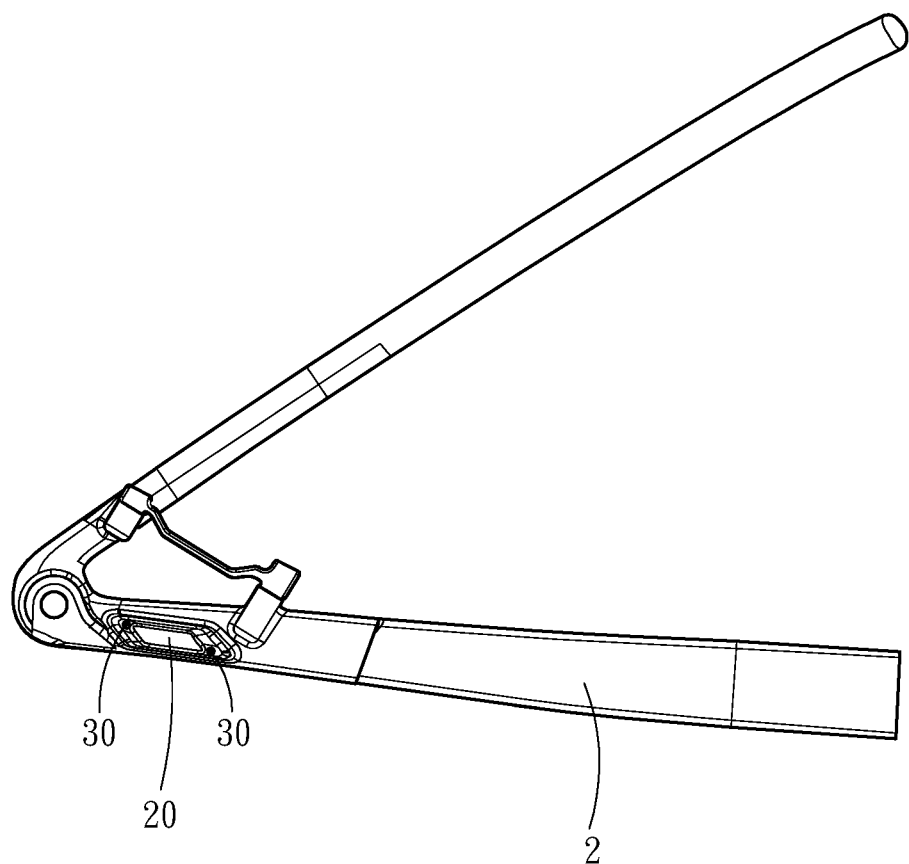
FIG. 4 is a partial plan view of the first embodiment of the present invention.

Referring to FIG. 4, the present invention further includes a fixing member 30. The fixing member 30 fixes the signal sensor 20 to the default position of the chain stay 2 so as to further prevent the signal sensor 20 from being disengaged or displaced during riding, thus improving the reliability of the speed sensing data. The fixing member 30 is a screw, but not limited thereto.

Figure 5:
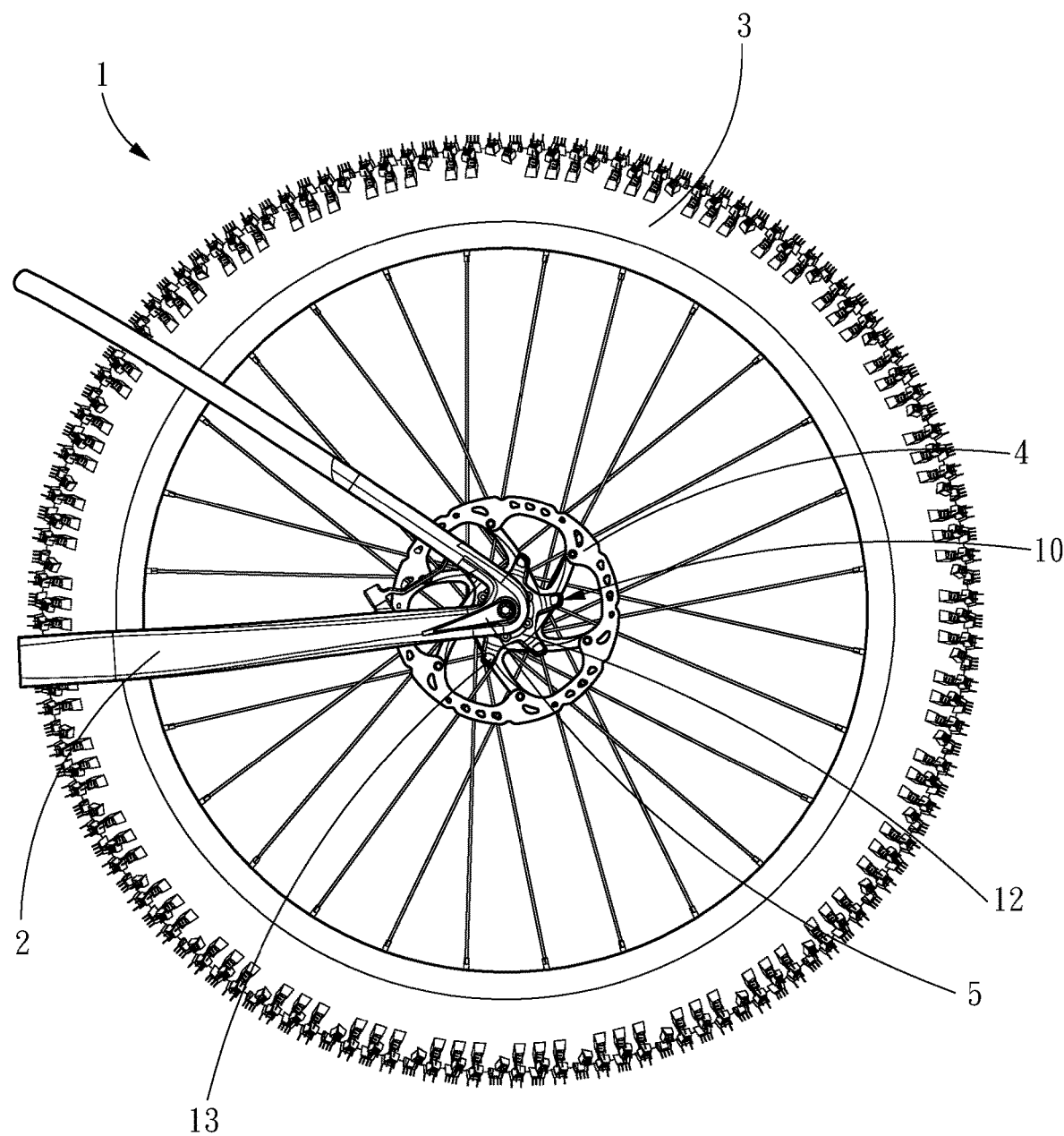
FIG. 5 is a plan view of a second embodiment of the present invention.
Figure 6A:
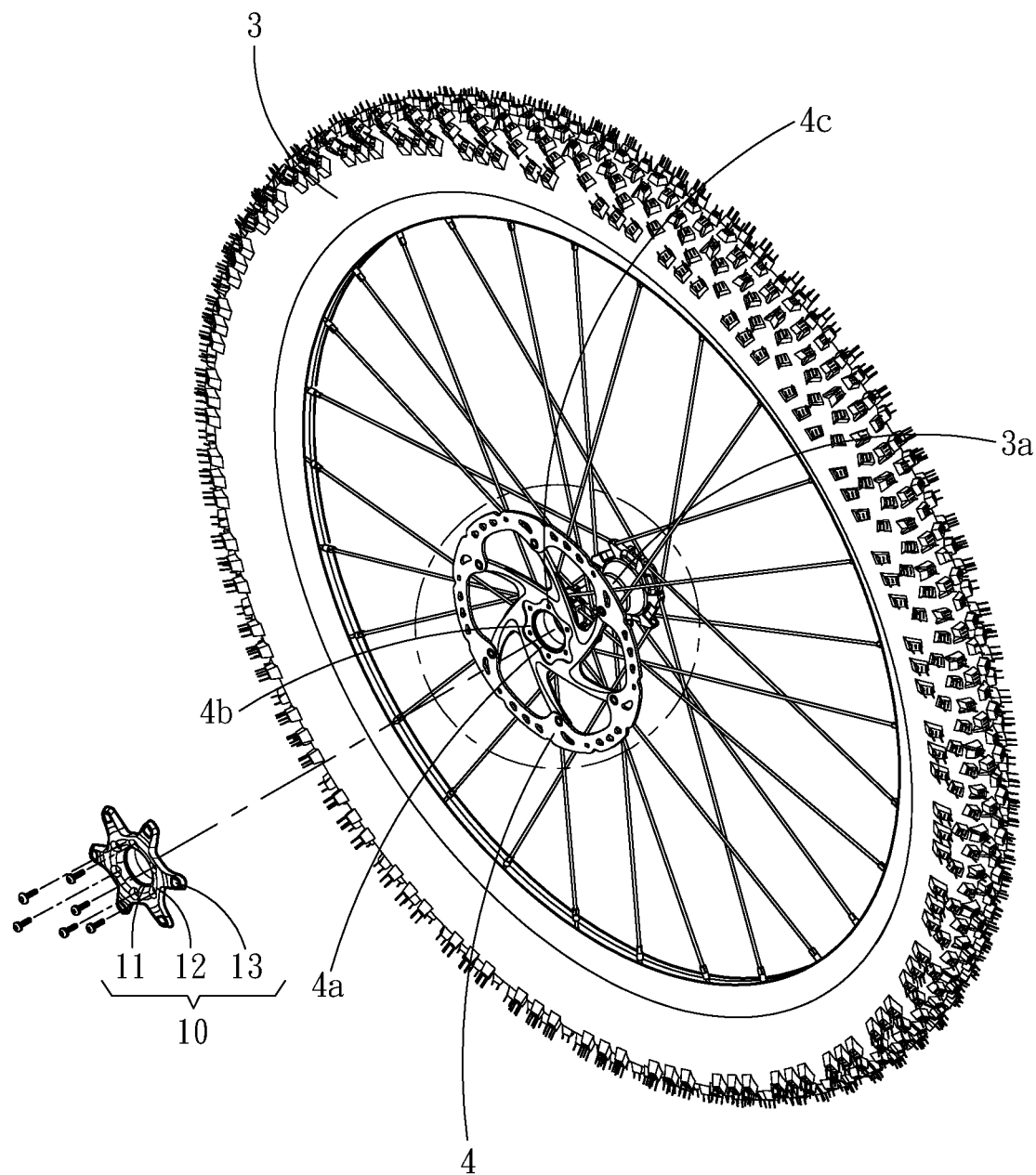
FIG. 6A is a partial exploded view of the second embodiment of the present invention.
Figure 6B:
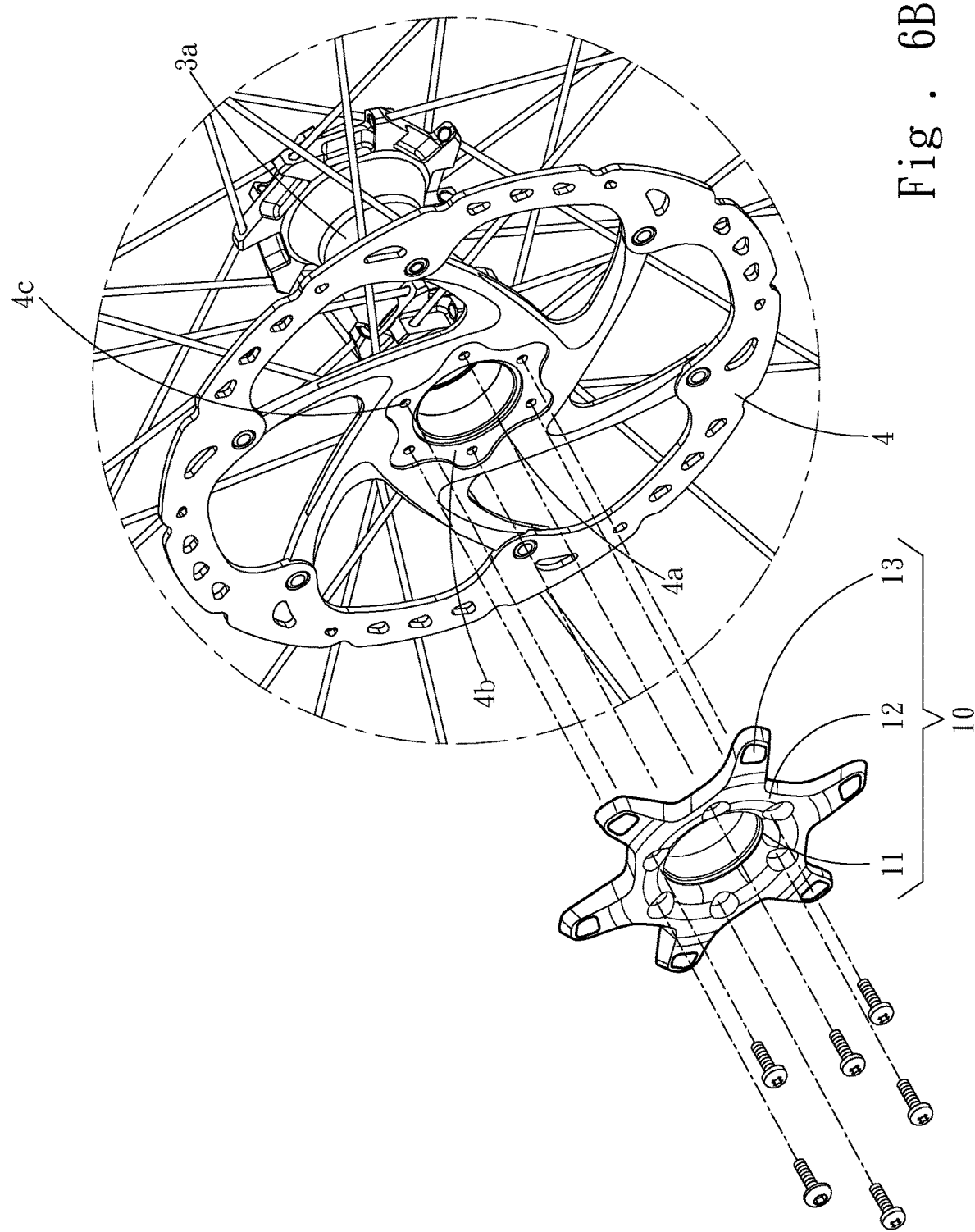
FIG. 6B is an enlarged partial view of the second embodiment of the present invention.

FIGS. 5, 6A and 6B refer to a second embodiment of the present invention. The brake disk 4 further includes a groove 4b. The signal transmitter 10 includes a central ring portion 12 and a plurality of extending sensing portions 13 extending outwardly from the central ring portion 12. The central ring portion 12 of the signal transmitter 10 is fixed in the groove 4b, so that the signal transmitter 10 may be positioned through the groove 4b, thereby reducing the displacement of the signal transmitting member 10 caused by the vibration during riding, so that the accuracy of the signal is able to be improved. The signal transmitter 10 may also be locked in the fixing holes 4c. In addition, the signal transmitter 10 further includes a through hole 11 in communication with the center hole 4a of the brake disk 4. Therefore, the positioning member 5 is able to be fixed through the through hole 11 and further prevented from disengagement and displacement. When the rear wheel 3 rotates, the signal sensor 20 senses the extending sensing portions 13 sequentially and receives the signals from the extending sensing portions 13.

Figure 7:
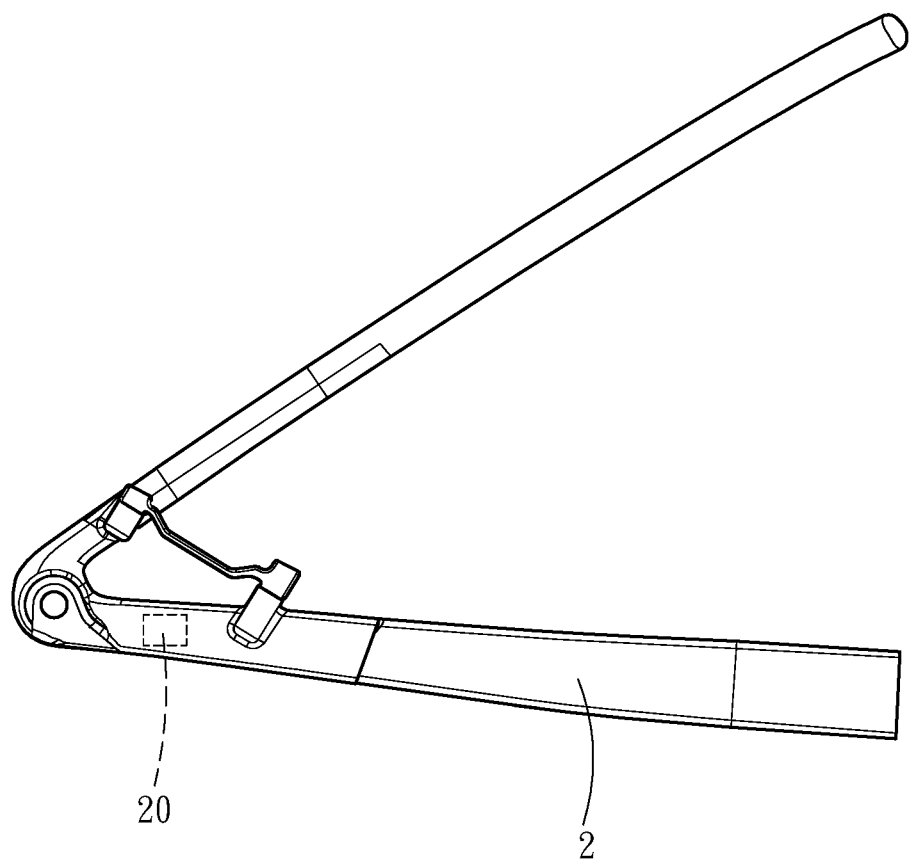
FIG. 7 is a partial schematic diagram of a third embodiment of the present invention.
Figure 8:
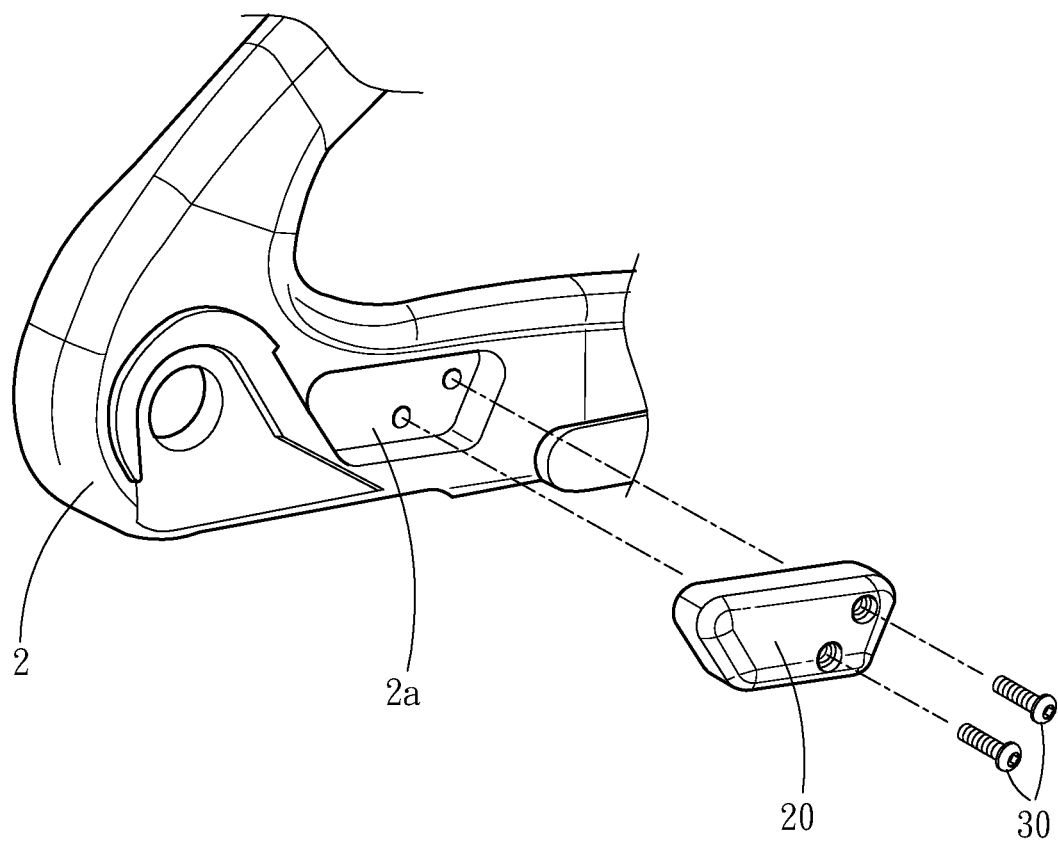
FIG. 8 is a partial exploded view of a fourth embodiment of the present invention.

FIGS. 7 and 8 respectively refer to a third embodiment and a fourth embodiment of the present invention. In the third embodiment, the default position of the signal sensor 20 is located in the chain stay 2. In the fourth embodiment, the chain stay 2 further includes a recess 2a, wherein the location of the recess 2a is the default position, so that the signal sensor 20 is disposed in the recess 2a. Therefore, the signal sensor 20 may be embedded in the recess 2a without being exposed to air. The above two ways of housing the signal sensor 20 may further reduce the wind resistance.

In summary, the present invention has the following characteristics:

1. By fixedly positioning the signal transmitter and the signal sensor at the brake disk and a default position of and the chain stay respectively, displacements of the signal transmitter and the signal sensor due to vibration is able to be prevented, thus the present invention provides reliable speed sensing data.
2. Since the signal transmitter and the signal sensor are fixedly positioned close to the bicycle body or built in the bicycle body, the wind resistance is reduced.
3. Through the arrangement of the groove and the through holes, the signal transmitter is further prevented from being displaced and disengaged, so as to improve the reliability of the speed sensing data.
4. Through the arrangement of the fixing holes onto which the signal transmitter is able to be locked and is further prevented from being displaced or disengaged to provide reliable speed sensing data.

What is claimed is:

1. A bicycle speed sensor provided on a bicycle, the bicycle comprising a chain stay, a rear wheel, a brake disk and a positioning member, wherein the rear wheel includes a hub and the brake disk includes a center hole disposed for the hub to pass through, the positioning member passes through the chain stay, the hub and the center hole to fix the rear wheel and the brake disk on the chain stay, and the bicycle speed sensor comprises:

a signal transmitter configured to transmit a signal, the signal transmitter being fixedly disposed on a side of the brake disk adjacent to the chain stay, and the signal transmitter being adjacent to the hub, wherein the brake disk includes a groove, the signal transmitter includes a central ring portion and a plurality of extending sensing portions extending outwardly from the central ring portion, and the central ring portion is fixedly disposed in the groove; and a signal sensor configured to receive the signal, the signal sensor being fixedly disposed at a default position of the chain stay, and the default position being flanked with the signal transmitter.

2. The bicycle speed sensor of claim 1, wherein the signal transmitter is a magnet.

3. The bicycle speed sensor of claim 1, wherein the signal transmitter includes a through hole in communication with the center hole of the brake disk.

4. The bicycle speed sensor of claim 1, wherein the default position is located in the chain stay.

5. The bicycle speed sensor of claim 1, wherein the bicycle speed sensor further comprises a fixing member configured to fix the signal sensor to the default position of the chain stay, and the signal sensor is disposed on a side of the chain stay adjacent to the signal transmitter.

6. The bicycle speed sensor of claim 5, wherein the fixing member is a screw.

7. The bicycle speed sensor of claim 1, wherein the chain stay comprises a recess, the location of the recess is the default position, and the signal sensor is disposed in the recess.

8. The bicycle speed sensor of claim 1, wherein the brake disk includes a plurality of fixing holes adjacent to the center hole, and the signal transmitter is locked in any two adjacent fixing holes of the fixing holes.

* * * * *